(12) United States Patent
Irie

(10) Patent No.: US 6,328,268 B1
(45) Date of Patent: Dec. 11, 2001

(54) ATTACHMENT PIECE FOR A BICYCLE DISPLAY DEVICE

(75) Inventor: Yoshinori Irie, Osakasayama (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/013,680

(22) Filed: Jan. 26, 1998

(30) Foreign Application Priority Data

Jan. 31, 1997 (JP) .................................................. 9-033238

(51) Int. Cl.$^7$ .............................. A47B 96/06; E04G 3/00; F16B 1/00; G09F 7/18; A47G 29/00
(52) U.S. Cl. ......................................... 248/230.1; 248/214
(58) Field of Search ............................. 248/227.4, 230.1, 248/214, 291; 224/420, 443, 448, 452

(56) References Cited

U.S. PATENT DOCUMENTS

| | | | |
|---|---|---|---|
| 3,130,925 | * 4/1964 | Appleton | 240/52 |
| 4,460,142 | * 7/1984 | O'Rorke | 248/231 |
| 4,479,693 | 10/1984 | Uyeda et al. | 339/119 R |
| 4,480,809 | * 11/1984 | Healy | 248/185 |
| 5,355,746 | * 10/1994 | Lin | 74/551.8 |
| 5,413,007 | 5/1995 | Vernon | 73/866.3 |
| 5,554,966 | * 9/1996 | Iijima et al. | 340/687 |
| 5,621,382 | 4/1997 | Yamamoto | 340/432 |

FOREIGN PATENT DOCUMENTS

| | | |
|---|---|---|
| 499870 A1 | 8/1992 | (EP) . |
| 2540241 | 8/1984 | (FR) . |
| 57-204288 | 6/1982 | (JP) . |
| 6-331389 | 12/1994 | (JP) .................................. G01D/7/00 |
| 6-331636 | 12/1994 | (JP) .................................. G01P/3/42 |

OTHER PUBLICATIONS

Tsuyama Mfg. Co., Ltd., "Cat Eye" catalog, p. 11, published prior to the filing date of this application.
Yokohama Rubber Co., Ltd., catalog published prior to the filing date of this application.
Patent Abstracts of Japan, vol. 15, No. 144, dated Apr. 11, 1991, for JP 3–20669, published Jan. 29, 1991.
German article, "Vielseitige Begleiter auf allen Trainingsstrecken" vol. 101, No. 5, Published May 1990, pp. 64–71.

\* cited by examiner

Primary Examiner—Ramon O Ramirez
Assistant Examiner—Jerome A. DeLuca
(74) Attorney, Agent, or Firm—James A. Deland

(57) ABSTRACT

An attachment piece for a bicycle display device includes an attachment component for attachment to a structural member of the bicycle, a support column fixed at a proximal portion thereof to the attachment component, and a base member having an attachment surface for attachment to the display device. The base member is pivotably coupled to a distal portion of the support column at a location aligned below the center of the attachment surface when the attachment surface is vertical. The support column may extend from the attachment component at an incline relative to a plane that extends through the attachment component perpendicular to a central axis of the attachment component.

5 Claims, 2 Drawing Sheets

ATTACHMENT PIECE FOR A BICYCLE DISPLAY DEVICE

BACKGROUND OF THE INVENTION

The present invention is directed to computer displays for bicycles and, more particularly, to an attachment piece for the computer display.

Display devices that display various data, such as the bicycle speed, the distance travelled, the shift position of the gear shifter, and other such data, are commonly attached to bicycles. When a display device such as this is attached to a bicycle, it is preferable for the display screen of the display device to be located near the reference center plane of the bicycle. It is also good for the position of the display screen of the display device, such as its height and inclination angle, to be freely adjustable to suit the preferences of the rider. Furthermore, it is preferable if the display device itself can be freely selected and replaced to suit the preferences of the rider. No such display device attachment piece that satisfied all of these rider needs existed in the past.

SUMMARY OF THE INVENTION

The present invention is directed to an attachment piece for a bicycle display device which allows the display screen that displays various data such as the bicycle speed, distance travelled, etc., can be fastened in the center position of the bicycle, and which allows the height, inclination angle, and the like of the display screen of the display device to be set freely. In one embodiment of the present invention, an attachment piece for a bicycle display device includes an attachment component for attachment to a structural member of the bicycle, a support column fixed at a proximal portion thereof to the attachment component, and a base member having an attachment surface for attachment to the display device. The base member is pivotably coupled to a distal portion of the support column at a location aligned below the center of the attachment surface when the attachment surface is vertical. This allows the height, inclination angle, and the like of the display screen of the display device to be set freely. If desired, the support column may extend from the attachment component at an incline relative to a plane that extends through the attachment component perpendicular to a central axis of the attachment component. Such an orientation of the support column allows the screen of the display device to be located in the center position of the bicycle.

DETAILED DESCRIPTION OF THE EMBODIMENTS

Figure 1:
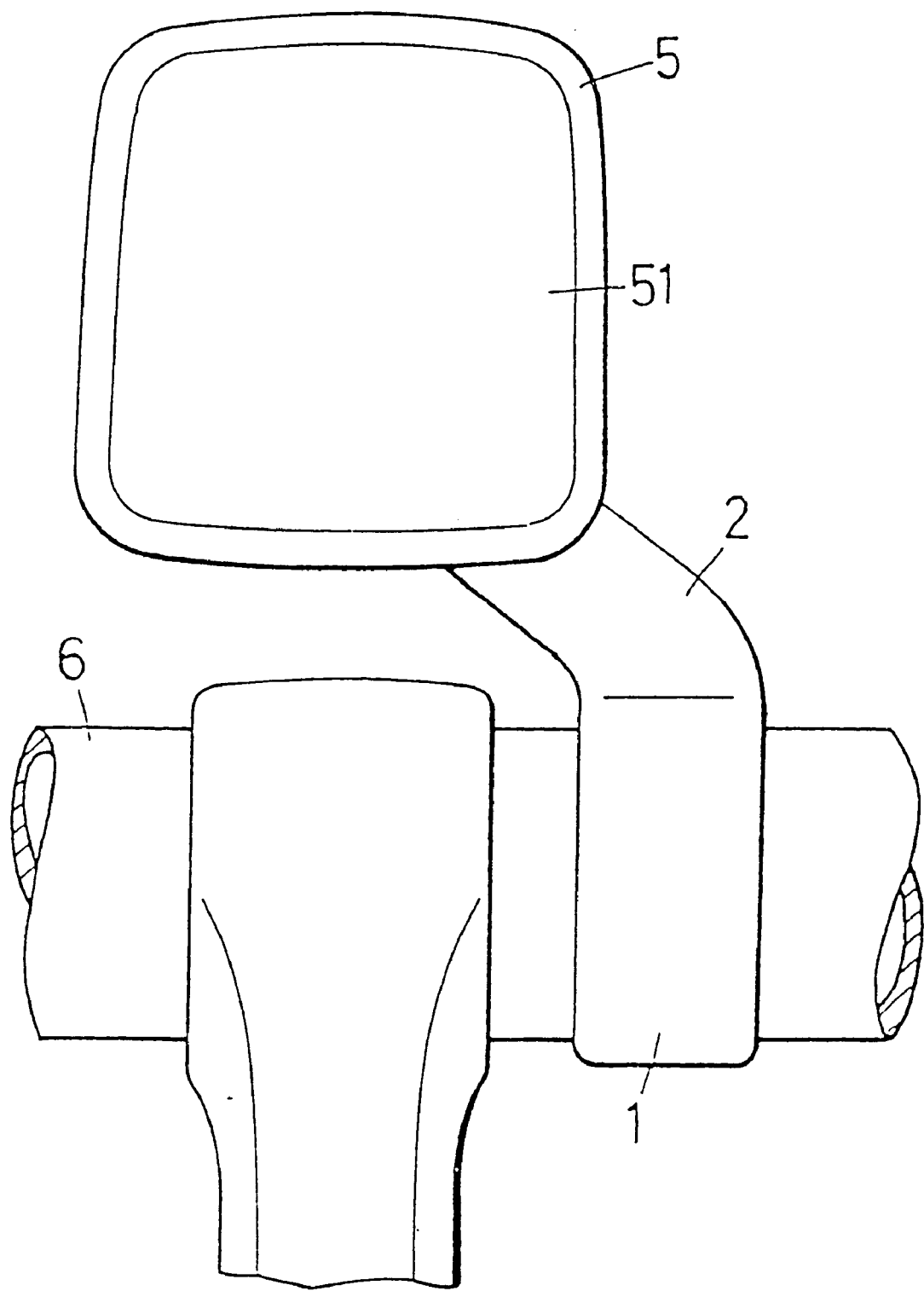
FIG. 1 is a front view of a particular embodiment of a bicycle computer display device according to the present invention.
Figure 2:
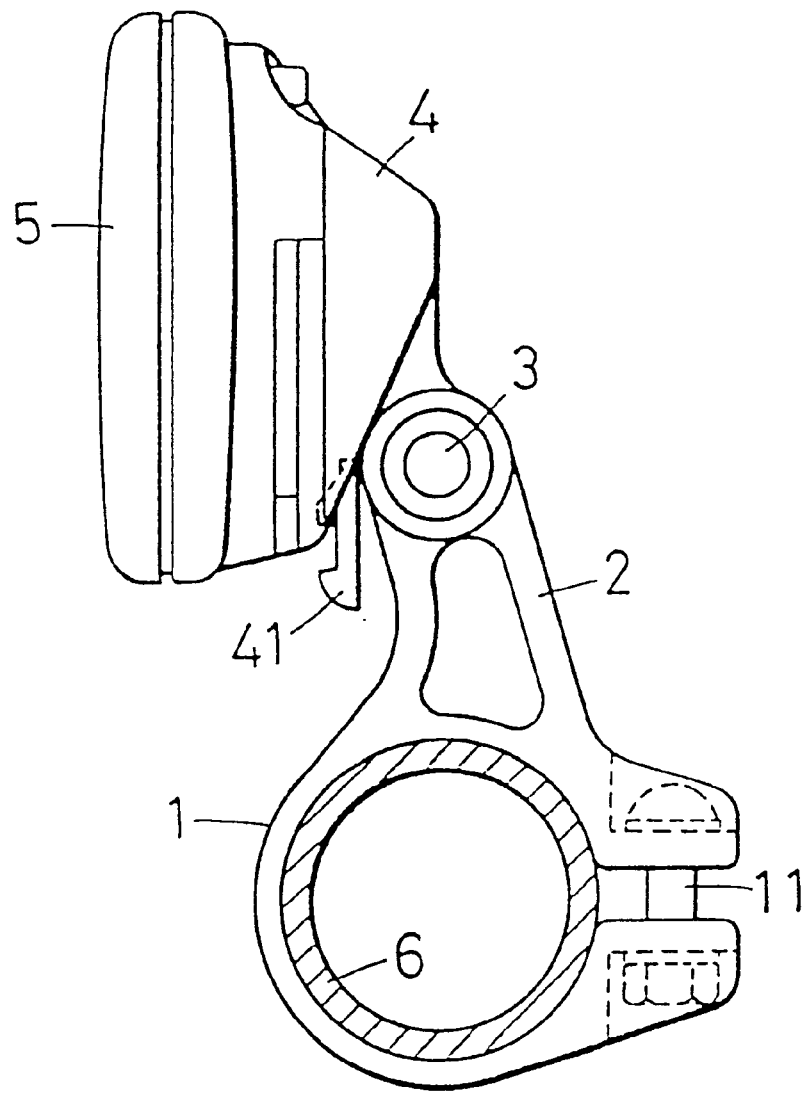
FIG. 2 is a side view of the display device shown in FIG. 1.

FIG. 1 is a front view of a particular embodiment of a bicycle computer display device according to the present invention, and FIG. 2 is a side view of the display device shown in FIG. 1. As shown in those Figures, a display device 5 measures or computes and displays the bicycle speed, distance travelled, lap times, crank spindle revolutions, the shift position of the change gear device, and other such data. A display screen 51 is positioned near the reference center plane of the bicycle, that is, in a place where it is easy for the rider to see it, such as in the center of the handlebar 6. The display screen 51 can comprise a liquid crystal display panel, a light emitting diode, or the like, but a liquid crystal display panel is preferable from the standpoint of electrical power consumption.

The attachment piece of the present invention for attaching the display device 5 to a bicycle comprises an attachment component 1 for fixing the attachment piece to the desired position (such as the handlebar), a support column 2 that is integrally fixed at one end to the attachment component, a swivel shaft 3 provided to the other end of the support column 2, and an attachment base member 4 that is swivelably supported on the support column 2 by the swivel shaft 3. The attachment component 1 is fixed to the handlebar 6 by a fastener 11 comprising a bolt, nut, or the like. Here, since the support column 2 can be fixed such that it forms any angle with the horizontal plane, the height of the swivel shaft 3 at the other end of the support column 2, that is, the height of the display device 5, can be adjusted to any height within a specific range.

The support column 2 is integrally fixed at one end, that is, at its base, to the attachment component 1. Also, the support column 2 is provided at an angle with respect to the center axis of the attachment component 1, more specifically, to the plane perpendicular to the center axis of the handlebar 6, and support column 2 extends from the attachment component 1 toward the reference center plane side of the bicycle. As a result, it is possible for the display screen 51 of the display device 5 to be positioned near the reference center plane of the bicycle. The swivel shaft 3, which is parallel to the center axis of the attachment component 1, is provided at the distal end side of the support column 2.

The attachment base member 4, which is furnished with a detachment mechanism that allows the display device 5 to be detached with ease, is provided to the distal end of the support column 2 such that it is able to swivel on the swivel shaft 3. The attachment base member 4, which is supported by the swivel shaft 3, is supported by friction in a semi-stationary state, such that the angle of inclination of the attachment base member 4 can be freely adjusted by hand, but once adjusted the inclination angle will be maintained if no force is applied. Therefore, the inclination angle of the display screen 51 can be freely adjusted by hand in a state in which the display device 5 has been attached to the attachment base member 4.

The positional relationship of the swivel shaft 3 to the attachment base member 4 is such that the center axis of the swivel shaft 3 is located near the lower end of the display device 5 attachment surface of the attachment base member 4. Specifically, the swivel shaft 3 is displaced downward with respect to the center position of the attachment surface when the attachment surface is in a vertical state. By having the swivel shaft disposed in this position, the distance from the swivel shaft 3 to the upper end of the display device 5 is greater, so less force is needed for adjustment when the inclination angle of the upper end of the display device 5 is adjusted by hand. Therefore, fine tuning of the inclination angle of the display screen 51 can be carried out quickly and easily.

Figure 3:
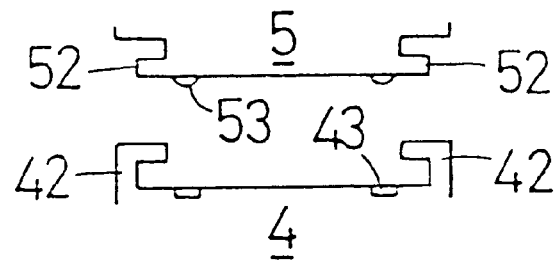
FIG. 3 is a detailed view showing how the display device shown in FIG. 1 is attached to the base member of the attachment component.

FIG. 3 is a diagram of the attachment structure of the display device 5 and the attachment base member 4. Protrusions 42 having a key-shaped cross section are provided on the left and right of the attachment base member 4, and the space between these protrusions 42 forms a holding groove for the display device 5. A held component 52 whose cross section matches the shape of the holding groove is provided to the attachment and removal surface of the display device 5, and the display device 5 can be easily attached to the attachment base member 4 by inserting the held component 52 into the holding groove and sliding the display device 5 downward.

The attachment position of the display device 5 is designed such that the display device 5 is stopped by the pawl of a stop lever 41 and cannot come loose. When the stop lever 41 is pushed to the rear of the display device 5, the pawl of the stop lever 41 moves away from the display device 5, and the display device 5 can be removed from the attachment base member 4. An electrical contact 53 and an electrical contact 43 are designed such that they come into contact with each other at the attachment position of the display device 5, and a signal from a sensor or manual switch is inputted to the display device 5.

While the above is a description of some embodiments of the present invention, various modifications well within the skill of the art may be employed. For example, the function performed by one element may be performed by two elements, and vice versa. The size, shape, orientation, and number of components may be changed as desired. Thus, the invention should not be limited to the specific embodiments disclosed. Instead, the scope of the invention should be ascertained by the following claims.

What is claimed is:

1. A bicycle display device comprising:

an attachment component for attachment to a structural member of the bicycle;

a support column fixed at a proximal portion thereof to the attachment component;

a liquid crystal display device;

a base member having an attachment surface attached to the display device; and wherein the base member is pivotably coupled to the support column at a location on the base member vertically offset from a center of the base member when the attachment surface is oriented vertically;

wherein the attachment component is structured for encircling the structural member of the bicycle around a central axis, wherein the support column extends from the attachment component at an incline relative to a plane that extends through the attachment component perpendicular to the central axis, and wherein the base member is attached to the support column remote from the attachment component.

2. The device according to claim 1 wherein the attachment component has a substantially circular inner peripheral surface.

3. The device according to claim 2 further comprising a fastener for fastening the attachment component to the structural member of the bicycle.

4. The device according to claim 1 further comprising a swivel shaft pivotably coupling the base member to the support column.

5. The attachment piece according to claim 1 wherein the base member is pivotably coupled to a distal portion of the support column.

\* \* \* \* \*